(12) United States Patent
Gardiner et al.

(10) Patent No.: US 9,607,189 B2
(45) Date of Patent: Mar. 28, 2017

(54) SMART CARD SYSTEM COMPRISING A CARD AND A CARRIER

(71) Applicant: Tactilis Sdn Bhd, Mont Kiara, Kuala Lumpur (MY)

(72) Inventors: Michael Gardiner, Kuala Lumpur (MY); Adriano Canzi, Los Angeles, CA (US)

(73) Assignee: Tactilis SDN BHD, Kuala Lumpur (MY)

( * ) Notice: Subject to any disclaimer, the term of this patent is extended or adjusted under 35 U.S.C. 154(b) by 0 days.

(21) Appl. No.: 14/596,572

(22) Filed: Jan. 14, 2015

(65) Prior Publication Data

US 2016/0203346 A1    Jul. 14, 2016

(51) Int. Cl.
| | |
|---|---|
| *G06K 5/00* | (2006.01) |
| *G06K 7/10* | (2006.01) |
| *G06Q 20/34* | (2012.01) |
| *G06K 19/07* | (2006.01) |
| *G06K 19/077* | (2006.01) |

(52) U.S. Cl.
CPC ..... *G06K 7/10158* (2013.01); *G06K 19/0718* (2013.01); *G06K 19/07703* (2013.01); *G06K 19/07749* (2013.01); *G06Q 20/352* (2013.01)

(58) Field of Classification Search
CPC .......... G06K 5/00; G06K 19/00; G06K 19/06; G06K 7/08; G06K 19/02; G06F 17/00
USPC ............... 235/380, 451, 492, 488, 487, 375; 713/175, 185–186
See application file for complete search history.

(56) References Cited

U.S. PATENT DOCUMENTS

| | | |
|---|---|---|
| 4,453,074 A | 6/1984 | Weinstein et al. |
| 4,582,985 A | 4/1986 | Loefberg |
| 4,725,719 A | 2/1988 | Oncken et al. |
| 4,747,147 A | 5/1988 | Sparrow |
| 4,910,521 A | 3/1990 | Mellon |
| 4,993,068 A | 2/1991 | Piosenka et al. |

(Continued)

FOREIGN PATENT DOCUMENTS

| | | |
|---|---|---|
| AU | 200238203 C | 11/2002 |
| AU | 757159 B2 | 2/2003 |

(Continued)

OTHER PUBLICATIONS

Jung, Stefan, "A Low-Power and High-Performance CMOS Fingerprint Sensing and Encoding Architecture," IEEE Journal of Solid-State Circuits, Jul. 1999, pp. 978-984, vol. 34, No. 7.

(Continued)

*Primary Examiner* — Edwyn Labaze
(74) *Attorney, Agent, or Firm* — Sheppard Mullin Richter & Hampton, LLP

(57) ABSTRACT

A system and method for facilitating wireless transactions using a smart card, the system comprising a housing having an opening configured to accept a smart card; a smart card interface configured to be coupled to the smart card when the smart card is accepted into the opening and configured to provide a data communication link with one or more processers in the smart card; a wireless transceiver configured to engage in wireless data communication with a transaction terminal when the smart card interface is coupled to the smart card; and a power source configured to supply power to the wireless transceiver and the smart card interface.

22 Claims, 11 Drawing Sheets

(56) References Cited

U.S. PATENT DOCUMENTS

| | | | |
|---|---|---|---|
| 5,175,416 A | 12/1992 | Mansvelt et al. |
| 5,180,901 A | 1/1993 | Hiramatsu |
| 5,180,902 A | 1/1993 | Schick et al. |
| 5,193,114 A | 3/1993 | Moseley et al. |
| 5,245,329 A | 9/1993 | Gokcebay |
| 5,259,649 A | 11/1993 | Shomron |
| 5,321,751 A | 6/1994 | Ray et al. |
| 5,438,184 A | 8/1995 | Roberts et al. |
| 5,461,217 A | 10/1995 | Claus et al. |
| 5,513,272 A | 4/1996 | Bogosian et al. |
| 5,521,363 A | 5/1996 | Tannenbaum |
| 5,521,966 A | 5/1996 | Friedes et al. |
| 5,534,857 A | 7/1996 | Laing et al. |
| 5,539,825 A | 7/1996 | Akiyama et al. |
| 5,541,985 A * | 7/1996 | Ishii et al. ............. 379/111 |
| 5,559,504 A | 9/1996 | Itsumi et al. |
| 5,559,887 A | 9/1996 | Davis et al. |
| 5,577,121 A | 11/1996 | Davis et al. |
| 5,578,808 A | 11/1996 | Taylor et al. |
| 5,581,630 A | 12/1996 | Bonneau et al. |
| 5,590,038 A | 12/1996 | Pitroda |
| 5,590,197 A | 12/1996 | Chen et al. |
| 5,602,918 A | 2/1997 | Chen et al. |
| 5,604,801 A | 2/1997 | Dolan et al. |
| 5,613,001 A | 3/1997 | Bakhoum |
| 5,677,953 A | 10/1997 | Dolphin |
| 5,703,753 A | 12/1997 | Mok |
| 5,721,781 A | 2/1998 | Deo et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,757,917 A | 5/1998 | Rose et al. |
| 5,764,789 A | 6/1998 | Pare, Jr. et al. |
| 5,778,173 A | 7/1998 | Apte et al. |
| 5,796,831 A | 8/1998 | Paradinas et al. |
| 5,799,087 A | 8/1998 | Rosen |
| 5,806,045 A | 9/1998 | Biorge et al. |
| 5,815,252 A | 9/1998 | Price et al. |
| 5,815,657 A | 9/1998 | Williams et al. |
| 5,826,241 A | 10/1998 | Stein et al. |
| 5,826,243 A | 10/1998 | Musmanno et al. |
| 5,835,894 A | 11/1998 | Adcock et al. |
| 5,838,818 A | 11/1998 | Herley et al. |
| 5,857,079 A | 1/1999 | Claus et al. |
| 5,869,822 A | 2/1999 | Meadows et al. |
| 5,875,432 A | 2/1999 | Sehr |
| 5,884,271 A | 3/1999 | Pitroda |
| 5,884,292 A | 3/1999 | Baker et al. |
| 5,889,941 A | 3/1999 | Tushie |
| 5,892,211 A | 4/1999 | Davis et al. |
| 5,898,838 A | 4/1999 | Wagner |
| 5,901,239 A | 5/1999 | Kamei |
| 5,905,908 A | 5/1999 | Wagner |
| 5,907,620 A | 5/1999 | Klemba et al. |
| 5,912,446 A | 6/1999 | Wong et al. |
| 5,915,973 A | 6/1999 | Hoehn et al. |
| 5,917,913 A | 6/1999 | Wang et al. |
| 5,917,925 A | 6/1999 | Moore et al. |
| 5,920,058 A | 7/1999 | Weber et al. |
| 5,920,629 A | 7/1999 | Rosen |
| 5,920,847 A | 7/1999 | Kolling et al. |
| 5,930,767 A | 7/1999 | Reber et al. |
| 5,931,917 A | 8/1999 | Nguyen et al. |
| 5,936,226 A | 8/1999 | Aucsmith |
| 5,942,761 A | 8/1999 | Tuli |
| 5,987,155 A | 11/1999 | Dunn et al. |
| 5,988,497 A | 11/1999 | Wallace et al. |
| 5,991,411 A | 11/1999 | Kaufman et al. |
| 5,995,014 A | 11/1999 | DiMaria |
| 6,012,039 A | 1/2000 | Hoffman et al. |
| 6,012,636 A | 1/2000 | Smith et al. |
| 6,016,476 A | 1/2000 | Maes et al. |
| 6,018,739 A | 1/2000 | McCoy et al. |
| 6,041,410 A | 3/2000 | Hsu et al. |
| 6,047,281 A | 4/2000 | Wilson et al. |
| 6,047,282 A | 4/2000 | Wilson et al. |
| 6,060,815 A | 5/2000 | Nysen |
| 6,070,159 A | 5/2000 | Wilson et al. |
| 6,091,835 A | 7/2000 | Smithies et al. |
| 6,095,413 A | 8/2000 | Tetro et al. |
| 6,101,477 A | 8/2000 | Hohle et al. |
| 6,104,311 A | 8/2000 | Lastinger |
| 6,104,922 A | 8/2000 | Baumann et al. |
| 6,116,736 A | 9/2000 | Stark et al. |
| 6,120,461 A | 9/2000 | Smyth |
| 6,130,623 A | 10/2000 | MacLellan et al. |
| 6,148,093 A | 11/2000 | McConnell et al. |
| 6,154,879 A | 11/2000 | Pare, Jr. et al. |
| 6,175,656 B1 | 1/2001 | Hoang |
| 6,182,892 B1 | 2/2001 | Angelo et al. |
| 6,199,079 B1 | 3/2001 | Gupta et al. |
| 6,199,762 B1 | 3/2001 | Hohle |
| 6,219,639 B1 | 4/2001 | Bakis et al. |
| 6,223,984 B1 | 5/2001 | Renner et al. |
| 6,233,348 B1 | 5/2001 | Fujii et al. |
| 6,256,690 B1 | 7/2001 | Carper |
| 6,257,486 B1 | 7/2001 | Teicher et al. |
| 6,257,620 B1 | 7/2001 | Kenney |
| 6,263,446 B1 | 7/2001 | Kausik et al. |
| 6,265,977 B1 | 7/2001 | Vega et al. |
| 6,268,788 B1 | 7/2001 | Gray |
| 6,269,348 B1 | 7/2001 | Pare, Jr. et al. |
| 6,270,011 B1 | 8/2001 | Gottfried |
| 6,272,562 B1 | 8/2001 | Scott et al. |
| 6,298,146 B1 | 10/2001 | Ilan et al. |
| 6,307,956 B1 | 10/2001 | Black |
| 6,325,285 B1 | 12/2001 | Baratelli |
| 6,327,578 B1 | 12/2001 | Linehan |
| 6,332,193 B1 | 12/2001 | Glass et al. |
| 6,338,048 B1 | 1/2002 | Mori |
| 6,338,435 B1 | 1/2002 | Carper |
| 6,345,761 B1 | 2/2002 | Seelbach et al. |
| 6,357,663 B1 | 3/2002 | Takahashi et al. |
| 6,360,953 B1 | 3/2002 | Lin et al. |
| 6,390,374 B1 | 5/2002 | Carper et al. |
| 6,424,249 B1 | 7/2002 | Houvener |
| 6,442,286 B1 | 8/2002 | Kramer |
| 6,446,862 B1 | 9/2002 | Mann |
| 6,480,825 B1 | 11/2002 | Sharma et al. |
| 6,480,935 B1 | 11/2002 | Carper et al. |
| 6,483,929 B1 | 11/2002 | Murakami et al. |
| 6,483,932 B1 | 11/2002 | Martinez et al. |
| 6,490,443 B1 | 12/2002 | Freeny, Jr. |
| 6,496,594 B1 | 12/2002 | Prokoski |
| 6,507,662 B1 | 1/2003 | Brooks |
| 6,519,565 B1 | 2/2003 | Clements et al. |
| 6,539,101 B1 | 3/2003 | Black |
| 6,560,581 B1 | 5/2003 | Fox et al. |
| 6,588,660 B1 | 7/2003 | Buescher et al. |
| 6,588,673 B1 | 7/2003 | Chan et al. |
| 6,591,249 B2 | 7/2003 | Zoka |
| 6,601,759 B2 | 8/2003 | Fife et al. |
| 6,601,762 B2 | 8/2003 | Piotrowski |
| 6,609,656 B1 | 8/2003 | Elledge |
| 6,615,191 B1 | 9/2003 | Seeley |
| 6,628,813 B2 | 9/2003 | Scott et al. |
| 6,629,591 B1 | 10/2003 | Griswold et al. |
| 6,631,201 B1 | 10/2003 | Dickinson et al. |
| 6,636,620 B1 | 10/2003 | Hoshino |
| 6,655,585 B2 | 12/2003 | Shinn |
| 6,657,614 B1 | 12/2003 | Ito et al. |
| 6,658,164 B1 | 12/2003 | Irving et al. |
| 6,662,166 B2 | 12/2003 | Pare, Jr. et al. |
| 6,669,086 B2 | 12/2003 | Abdi et al. |
| 6,681,328 B1 | 1/2004 | Harris et al. |
| 6,687,391 B1 | 2/2004 | Scott et al. |
| 6,697,947 B1 | 2/2004 | Matyas, Jr. et al. |
| 6,703,918 B1 | 3/2004 | Kita |
| 6,719,200 B1 | 4/2004 | Wiebe |
| 6,732,919 B2 | 5/2004 | Macklin et al. |
| 6,734,887 B2 | 5/2004 | Field |
| 6,744,909 B1 | 6/2004 | Kostrzewski et al. |
| 6,744,910 B1 | 6/2004 | McClurg et al. |

(56) References Cited

U.S. PATENT DOCUMENTS

| | | |
|---|---|---|
| 6,765,470 B2 | 7/2004 | Shinzaki |
| 6,776,332 B2 | 8/2004 | Allen et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,826,000 B2 | 11/2004 | Lee et al. |
| 6,828,299 B2 | 12/2004 | Yang et al. |
| 6,828,960 B2 | 12/2004 | Parry |
| 6,834,795 B1 | 12/2004 | Rasmussen et al. |
| 6,867,850 B2 | 3/2005 | McClurg |
| 6,870,946 B1 | 3/2005 | Teng |
| 6,873,974 B1 | 3/2005 | Schutzer |
| 6,877,097 B2 | 4/2005 | Hamid et al. |
| 6,886,104 B1 | 4/2005 | McClurg et al. |
| 6,892,940 B2 | 5/2005 | Kocarev et al. |
| 6,901,154 B2 | 5/2005 | Dunn |
| 6,914,517 B2 | 7/2005 | Kinsella |
| 6,917,695 B2 | 7/2005 | Teng et al. |
| 6,925,439 B1 | 8/2005 | Pitroda |
| 6,925,565 B2 | 8/2005 | Black |
| 6,928,181 B2 | 8/2005 | Brooks |
| 6,928,195 B2 | 8/2005 | Scott et al. |
| 6,929,413 B2 | 8/2005 | Schofield |
| 6,931,538 B1 | 8/2005 | Sawaguchi |
| 6,934,861 B2 | 8/2005 | Haala |
| 6,944,768 B2 | 9/2005 | Siegel et al. |
| 6,954,260 B2 | 10/2005 | Arnold et al. |
| 6,968,453 B2 | 11/2005 | Doyle et al. |
| 6,970,582 B2 | 11/2005 | Langley |
| 6,971,031 B2 | 11/2005 | Haala |
| 6,983,062 B2 | 1/2006 | Smith |
| 6,988,665 B2 | 1/2006 | Schofield |
| 6,996,259 B2 | 2/2006 | Cannon et al. |
| 7,010,148 B2 | 3/2006 | Irving et al. |
| 7,028,893 B2 | 4/2006 | Goodman et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,059,531 B2 | 6/2006 | Beenau et al. |
| 7,068,822 B2 | 6/2006 | Scott |
| 7,073,711 B2 | 7/2006 | Fernandez et al. |
| 7,079,007 B2 | 7/2006 | Siegel et al. |
| 7,095,880 B2 | 8/2006 | Martinez et al. |
| 7,102,523 B2 | 9/2006 | Shanks et al. |
| 7,103,201 B2 | 9/2006 | Scott et al. |
| 7,127,088 B1 | 10/2006 | Grajewski et al. |
| 7,132,946 B2 | 11/2006 | Waldner et al. |
| 7,155,039 B1 | 12/2006 | Lo |
| 7,162,060 B1 | 1/2007 | Barton et al. |
| 7,164,440 B2 | 1/2007 | Cannon |
| 7,165,716 B1 | 1/2007 | Mödl et al. |
| 7,171,662 B1 | 1/2007 | Misra et al. |
| 7,181,017 B1 | 2/2007 | Nagel et al. |
| 7,203,344 B2 | 4/2007 | McClurg et al. |
| 7,218,202 B2 | 5/2007 | Bacchiaz et al. |
| 7,239,227 B1 | 7/2007 | Gupta et al. |
| 7,266,848 B2 | 9/2007 | Moyer et al. |
| 7,271,881 B2 | 9/2007 | Arnold et al. |
| 7,278,025 B2 | 10/2007 | Saito et al. |
| 7,289,649 B1 | 10/2007 | Walley et al. |
| 7,303,120 B2 | 12/2007 | Beenau et al. |
| 7,305,563 B2 | 12/2007 | Bacchiaz et al. |
| 7,308,122 B2 | 12/2007 | McClurg et al. |
| 7,314,164 B2 | 1/2008 | Bonalle et al. |
| 7,314,165 B2 | 1/2008 | Bonalle et al. |
| 7,319,565 B2 | 1/2008 | Arnold et al. |
| 7,325,724 B2 | 2/2008 | Bonalle et al. |
| 7,466,348 B2 | 12/2008 | Morikawa et al. |
| 7,506,172 B2 | 3/2009 | Bhakta |
| 7,543,337 B2 | 6/2009 | D'Agnolo |
| 7,724,137 B2 * | 5/2010 | Page .................... 340/572.1 |
| 7,730,526 B2 | 6/2010 | Lamplough |
| 7,751,593 B2 | 7/2010 | Hombo |
| 7,938,329 B2 | 5/2011 | Tran |
| 7,946,501 B2 | 5/2011 | Borracci |
| 7,992,789 B2 | 8/2011 | Borracci |
| 8,186,580 B2 | 5/2012 | Cannon et al. |
| 8,253,531 B2 | 8/2012 | Davis et al. |
| 8,276,816 B2 | 10/2012 | Gardner |
| 8,307,207 B2 | 11/2012 | Bacchiaz et al. |
| 8,360,322 B2 | 1/2013 | Bonalle et al. |
| 8,485,442 B2 | 7/2013 | McNeal |
| 8,490,872 B2 | 7/2013 | Kim |
| 8,499,164 B2 | 7/2013 | Ortiz et al. |
| 8,553,251 B2 | 10/2013 | Iizuka |
| 8,572,395 B2 | 10/2013 | Ito |
| 8,598,981 B2 | 12/2013 | Idsøe et al. |
| 8,607,063 B2 | 12/2013 | Ikeuchi |
| 8,708,230 B2 | 4/2014 | Cannon et al. |
| 8,713,660 B2 | 4/2014 | Carper |
| 8,756,680 B2 | 6/2014 | Shashidhar |
| 8,782,427 B2 | 7/2014 | Fedronic et al. |
| 8,783,578 B2 | 7/2014 | Kim |
| 8,786,033 B2 | 7/2014 | Saito |
| 8,799,167 B2 | 8/2014 | Carper |
| 2002/0059523 A1 | 5/2002 | Bacchiaz et al. |
| 2002/0095587 A1 | 7/2002 | Doyle et al. |
| 2002/0153424 A1 | 10/2002 | Li |
| 2003/0046554 A1 * | 3/2003 | Leydier et al. ............. 713/186 |
| 2003/0159044 A1 * | 8/2003 | Doyle ................. G06F 21/32 |
| | | 713/176 |
| 2004/0129787 A1 | 7/2004 | Saito et al. |
| 2004/0188519 A1 * | 9/2004 | Cassone ................ G06Q 10/02 |
| | | 235/382 |
| 2004/0266267 A1 | 12/2004 | Inaba |
| 2005/0035200 A1 | 2/2005 | Hendrick |
| 2005/0139685 A1 | 6/2005 | Kozlay |
| 2005/0144354 A1 * | 6/2005 | Murashita ............... G06F 21/34 |
| | | 711/100 |
| 2005/0182947 A1 | 8/2005 | Bacchiaz et al. |
| 2005/0240778 A1 | 10/2005 | Saito |
| 2006/0032905 A1 * | 2/2006 | Bear et al. .................. 235/380 |
| 2006/0113381 A1 | 6/2006 | Hochstein et al. |
| 2006/0161789 A1 * | 7/2006 | Doughty ............. G06Q 20/327 |
| | | 713/186 |
| 2006/0208066 A1 * | 9/2006 | Finn et al. .................. 235/380 |
| 2007/0040017 A1 * | 2/2007 | Kozlay ............. G06K 19/07354 |
| | | 235/380 |
| 2007/0043594 A1 | 2/2007 | Lavergne |
| 2007/0073619 A1 | 3/2007 | Smith |
| 2007/0124536 A1 | 5/2007 | Carper |
| 2007/0154018 A1 | 7/2007 | Watanabe |
| 2008/0005425 A1 | 1/2008 | Saito |
| 2008/0016370 A1 * | 1/2008 | Libin .................. G06Q 20/367 |
| | | 713/185 |
| 2008/0019578 A1 | 1/2008 | Saito et al. |
| 2008/0040615 A1 | 2/2008 | Carper et al. |
| 2008/0054875 A1 | 3/2008 | Saito |
| 2008/0072065 A1 | 3/2008 | Bonalle et al. |
| 2008/0097924 A1 | 4/2008 | Carper et al. |
| 2008/0164325 A1 | 7/2008 | Borracci |
| 2008/0201658 A1 | 8/2008 | Saito et al. |
| 2008/0223921 A1 | 9/2008 | Salazar et al. |
| 2008/0223925 A1 | 9/2008 | Saito et al. |
| 2008/0230613 A1 | 9/2008 | Leibenguth |
| 2009/0084858 A1 | 4/2009 | Borracci |
| 2009/0313493 A1 | 12/2009 | Ide |
| 2009/0322477 A1 | 12/2009 | Celorio |
| 2010/0039234 A1 | 2/2010 | Soliven et al. |
| 2010/0148312 A1 | 6/2010 | Jung |
| 2010/0153451 A1 | 6/2010 | Delia et al. |
| 2010/0215224 A1 | 8/2010 | Saito |
| 2010/0257359 A1 * | 10/2010 | Currie ................. H04L 63/1466 |
| | | 713/168 |
| 2010/0260388 A1 * | 10/2010 | Garrett ................. G06Q 20/22 |
| | | 382/124 |
| 2011/0256832 A1 | 10/2011 | Park |
| 2012/0016798 A1 | 1/2012 | Carper |
| 2012/0079273 A1 | 3/2012 | Bacchiaz et al. |
| 2012/0218079 A1 | 8/2012 | Kim |
| 2012/0241524 A1 | 9/2012 | Blot et al. |
| 2012/0297467 A1 | 11/2012 | Carper |
| 2012/0313754 A1 | 12/2012 | Bona .................... 340/5.82 |

(56) References Cited

U.S. PATENT DOCUMENTS

| | | | |
|---|---|---|---|
| 2013/0026230 A1 | 1/2013 | Cannon et al. | |
| 2013/0036463 A1* | 2/2013 | Shashidhar | 726/20 |
| 2013/0056540 A1 | 3/2013 | Blot et al. | |
| 2013/0080788 A1 | 3/2013 | Bacchiaz et al. | |
| 2014/0046785 A1 | 2/2014 | Jenkins | |
| 2014/0232526 A1 | 8/2014 | Carper | |

FOREIGN PATENT DOCUMENTS

| | | |
|---|---|---|
| AU | 2003274967 A1 | 4/2004 |
| AU | 2004218720 B2 | 11/2004 |
| AU | 784438 B2 | 4/2006 |
| AU | 2006311596 A1 | 5/2007 |
| AU | 2007229728 A1 | 10/2007 |
| AU | 2010224455 A1 | 1/2011 |
| CA | 2346592 A1 | 11/2001 |
| CA | 2498288 A1 | 3/2004 |
| CA | 2564707 A1 | 11/2005 |
| CA | 2629435 A1 | 5/2007 |
| CA | 2748563 A1 | 3/2012 |
| CA | 2844003 A1 | 2/2013 |
| DE | 60111892 T2 | 8/2005 |
| DE | 10393215 T5 | 9/2005 |
| EP | 994439 A2 | 4/2000 |
| EP | 1256908 A1 | 11/2002 |
| EP | 1537526 | 6/2005 |
| EP | 1157906 A2 | 7/2005 |
| EP | 1647942 A2 | 4/2006 |
| EP | 1716660 | 11/2006 |
| EP | 1759337 | 3/2007 |
| EP | 1924976 | 5/2008 |
| EP | 1952244 | 8/2008 |
| EP | 2290625 A1 | 3/2011 |
| EP | 2434462 A1 | 3/2012 |
| EP | 2569735 B1 | 3/2013 |
| FR | 2953619 A1 | 6/2011 |
| FR | 2959847 A1 | 11/2011 |
| GB | 2473283 A | 3/2011 |
| JP | 02118790 A | 5/1990 |
| JP | 11039483 A | 2/1999 |
| JP | 2001250064 A | 9/2001 |
| JP | 2001323691 A | 11/2001 |
| JP | 2002183706 A | 6/2002 |
| JP | 2005242650 A | 9/2005 |
| JP | 2005326995 A | 11/2005 |
| JP | 2006257871 A | 9/2006 |
| JP | 2007156785 A | 6/2007 |
| JP | 2008078820 A | 4/2008 |
| JP | 2011090686 A | 5/2011 |
| JP | 2012074011 A | 4/2012 |
| WO | 0116707 A1 | 3/2001 |
| WO | 0116759 A1 | 3/2001 |
| WO | 0116865 A1 | 3/2001 |
| WO | 0116873 A1 | 3/2001 |
| WO | 0116874 A1 | 3/2001 |
| WO | 0139427 A1 | 3/2001 |
| WO | 2004025545 A2 | 3/2004 |
| WO | 2005104704 A1 | 11/2005 |
| WO | 2006102625 A2 | 9/2006 |
| WO | 2007022423 A2 | 2/2007 |
| WO | 2007056476 A2 | 5/2007 |
| WO | 2007064429 A1 | 6/2007 |
| WO | 2007143670 A2 | 12/2007 |
| WO | 2007146681 A2 | 12/2007 |
| WO | 2008010899 A2 | 1/2008 |
| WO | 2008079491 A2 | 7/2008 |
| WO | 2010019961 A2 | 2/2010 |
| WO | 2010077999 A2 | 7/2010 |
| WO | 2010133469 A1 | 11/2010 |
| WO | 2011067543 A1 | 6/2011 |
| WO | 2011141659 A2 | 11/2011 |

OTHER PUBLICATIONS

Noore, Afzel, "Highly Robust Biometric Smart Card Design," IEEE Transactions on Consumer Electronics, Nov. 2000, pp. 1059-1063, vol. 46, No. 4.
Sanchez-Reillo, Raul, et al., "Fingerprint Verification Using Smart Cards for Access Control Systems," 2001, pp. 250-253.
Sanchez-Reillo, Raul, et al., "Microprocessor Smart Cards with Fingerprint User Authorization," IEEE AESS Systems Magazine, Mar. 2003, pp. 22-24.
Sung, Bum Pan, et al., "An Ultra-Low Memory Fingerprint Matching Algorithm and Its Implementation on a 32-bit Smart Card," IEEE, Mar. 26, 2003, pp. 453-459.
Kim, Dong-Sun, "On the Design of an Embedded Biometric Smart Card Reader," IEEE, Apr. 16, 2008, pp. 573-577.
Kim, Seong-Jin, "A CMOS Fingerprint System-on-a-Chip With Adaptable Pixel Networks and Column-Parallel Processors for Image Enhancement and Recognition," IEEE Journal of Solid-State Circuits, Nov. 2008, pp. 2558-2567, vol. 43, No. 11.
Nixon, Jenny, "Reconciling your Quicken Account with the Bank Statement," University of Nebraska, Lincoln, 2005.
"Biometric Technology for Secure Access," Sep. 18, 2007, Biometric Associates, Inc., Baltimore, MD, USA.
Patent Cooperation Treaty, International Search Report for PCT/US2016/000020, May 12, 2016, pp. 4-5.
Patent Cooperation Treaty, International Search Report for PCT/US2016/000026, May 6, 2016, pp. 4-5.

* cited by examiner

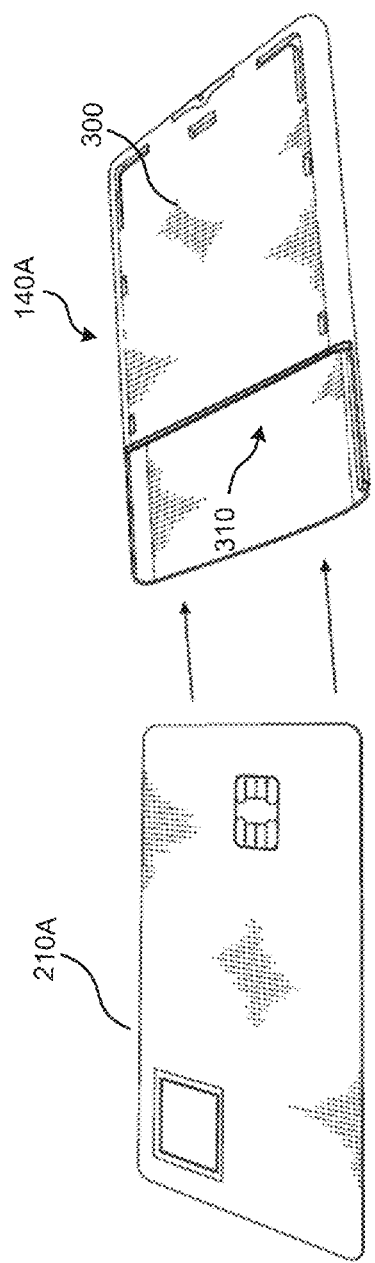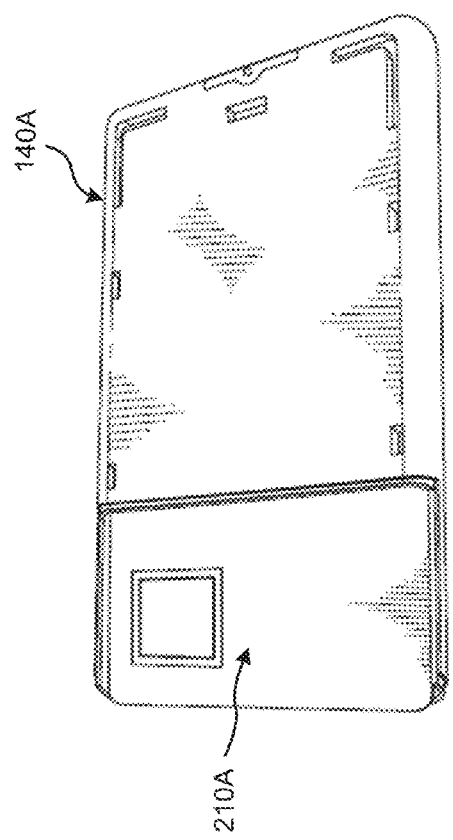
Fig. 5
Fig. 6

SMART CARD SYSTEM COMPRISING A CARD AND A CARRIER

CROSS-REFERENCE TO RELATED APPLICATIONS

The present application is related to concurrently filed U.S. patent application Ser. No. 14/596,508, filed Jan. 14, 2015 entitled "System and Method for Requesting Reconciliation of Electronic Transactions for Enhanced Security"; U.S. patent application Ser. No. 14/596,472, filed Jan. 14, 2015 entitled "System and Method for Comparing Electronic Transaction Records for Enhanced Security"; and U.S. patent application Ser. No. 14/596,420, filed Jan. 14, 2015 entitled "System and Method for Reconciling Electronic Transaction Records for Enhanced Security," which are all incorporated herein by reference in their entirety.

FIELD OF THE INVENTION

The present disclosure relates generally to smart cards, and more particularly, some embodiments relate to smart card systems comprising a card and a carrier.

BACKGROUND

Electronic transactions, such as credit card transactions, can be conducted using smart cards. A smart card is a card with embedded integrated circuits that include a processor and a memory. Smart cards can provide identification, authentication, data storage, and application processing, as well as serving as credit or ATM debit cards, phone or fuel cards, and high-security access-control cards for granting access to a building or computer. Smart cards can authenticate the identity of a user by employing a public key infrastructure (PKI). This authentication process may be conducted in a variety of ways, including through the use of a pin, password, or biometric authentication, or a combination of methods for added layers of security.

Smart card readers come in many different form factors and operate in many different ways. Some readers require insertion of the entire card into the reader. Others may allow a portion of the card to remain accessible by the user. These differences between smart card readers make it difficult to include additional layers of security, such as biometric authentication, because such features may be physically incompatible with the operation of the smart card reader.

Contactless transactions allow for the completion of transactions using smart cards wirelessly using near field communications (NFC) and RFID technologies. These contactless smart cards are built with compatible antennas inside the card. However, adding contactless capability increases the complexity of the smart card design and manufacture. In addition, such transactions may only be conducted using smart card readers designed for such transactions. Moreover, to provide a smart card with the capability to communicate over different wireless standards, such as Wi-Fi or Bluetooth, would require a more complex and powerful transceiver within the card. This adds to the complexity of the card design through the need to include a greater number of computing components within the form factor of the card, including an on-board power source.

BRIEF SUMMARY OF THE INVENTION

According to various embodiments of the disclosed technology, a smart card carrier is provided comprising a housing having an opening configured to accept a smart card; a smart card interface configured to be coupled to the smart card when the smart card is accepted into the opening and configured to provide a data communication link with one or more processors in the smart card; a wireless transceiver configured to engage in wireless data communication with a transaction terminal when the smart card interface is coupled to the smart card; and a power source configured to supply power to the wireless transceiver and the smart card interface.

According to various embodiments of the disclosed technology, a method for facilitating wireless transactions with a smart card through a smart card carrier is provided, comprising receiving from a transaction terminal a request related to a transaction involving the smart card; engaging in data communication related to the request with one or more processors in the smart card through a smart card interface coupled to an interface on the smart card; and transmitting a response to the request to the transaction terminal through the wireless transceiver.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF SEVERAL VIEWS OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5 is an example diagram of the mating of a smart card carrier and a smart card in accordance with an embodiment of the technology disclosed herein.

FIG. 6 is an example diagram illustrating a smart card engaged with a smart card carrier in accordance with an embodiment of the technology disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the technology disclosed herein are directed toward a system for and method of conducting wireless transactions using a smart card. More particularly, the various embodiments of the technology disclosed herein relate to providing wireless transaction capability to a contact smart card.

Before describing the technology disclosed in detail, it is useful to describe example smart cards with which the technology can be implemented. Smart cards come in a variety of types, examples of which are shown and described in FIGS. 1-4. The earliest version of a card with integrated circuits embedded therein included memory circuitry to allow for storage of information. Transaction applications would run on the terminals with which the cards were used, obtaining the information required for the transactions stored in the memory component of the card. Overtime, microprocessors were added to create the basic "smart card" concept known today. The addition of the microprocessor allowed for the applications for transactions to be stored and run on the cards themselves. The addition of on-board processors, of course, increased the complexity of the card. Accordingly, card designers must make choices regarding the level of functionality necessary for the card's purpose and determine how complex a design to create. One aspect of the technology disclosed herein provides additional functionality to any type of smart card architecture.

Figure 1:
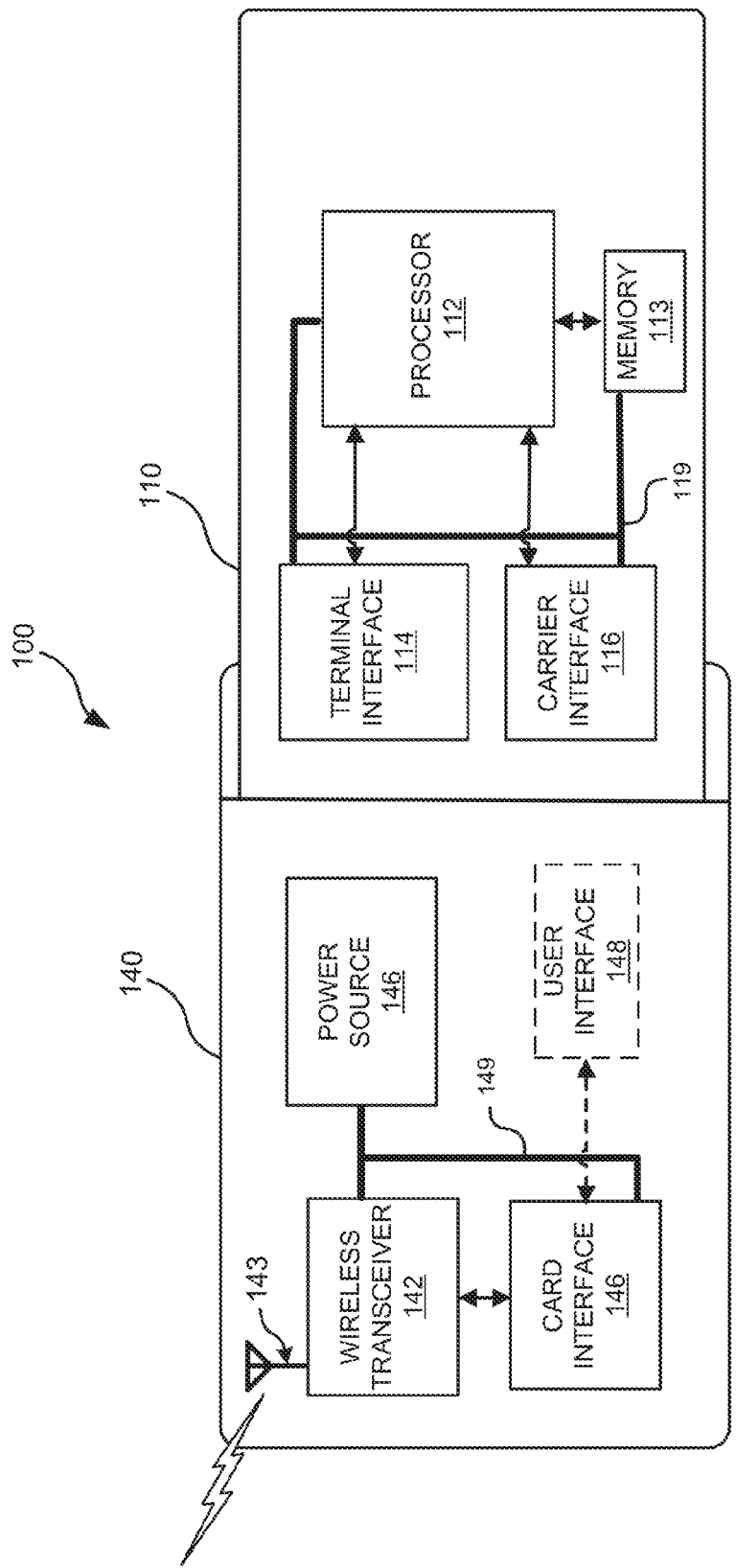
FIG. 1 is an example diagram of a smart card carrier and a smart card in accordance with an embodiment of the technology disclosed herein.

FIG. 1 is an example block diagram of a smart card system 100 comprising a card 110 and a carrier 140 in accordance with the technology herein disclosed. The card 110 shown in FIG. 1 is basic smart card design, as described above. In various embodiments, card 110 has substantially the same shape and form factor as conventional credit and debit cards. Card 110 comprises a processing module 112 and a memory 113. Processing module 112 may be a microprocessor, microcontroller, application-specific integrated circuit (ASIC), field-programmable gate array (FPGA), or any combination of components configured to perform and/or control the functions of card 110. Memory 113 may be a read-only memory (ROM) such as EPROM or EEPROM, flash, or any other storage component capable of storing executory programs and information for use by the processing module 112.

In various embodiments, card 110 may comprise a terminal interface 114. Terminal interface 114 is communicatively coupled to processing module 112. Terminal interface 114 may be configured for use when card 110 is being used by itself (i.e., without the carrier 140), for example, when card 110 is engaged directly in a sales transaction via a point-of-sale (POS) terminal at a retail store or a kiosk or an access control transaction at a computer or building. In various embodiments, terminal interface 114 may include one or more conductive pads or pins that make electrical contact with corresponding conductive pads or pins provided in the terminal or smart card reader. Data communication between card 110 and the terminal occurs through terminal interface 114. In various embodiments, when card 110 is engaged with the terminal or smart card reader for a transaction, some of the conductive pads of terminal interface 114 provide paths by which electrical power flows from the terminal to processing module 112 and memory 113 via power line 119. This eliminates the need for card 110 to have its own on-board power source, simplifying design and manufacture.

In various embodiments, card 110 may also include a carrier interface 116. Carrier interface 116 is communicatively coupled to processing module 112. Carrier interface 116 may be configured for use with carrier 140. In various embodiments, carrier interface 116 may include one or more conductive pads or pins that make electrical contact with a corresponding card interface 144 in smart card carrier 140. In various embodiments, when card 110 is engaged with smart card carrier 140, some of the conductive pads or pins of carrier interface 116 provide paths by which electrical power flows from power source 146 of carrier 140 to processing module 112 and memory 113 via power line 119, similar to the power management described above between card 110 and a terminal while conducting a transaction.

Although shown in FIG. 1 as two different interfaces, one having ordinary skill in the art would understand that terminal interface 114 and carrier interface 116 may be combined into a single interface.

In various embodiments, carrier 140 comprises a housing, a wireless transceiver module 142, a card interface 144, a power source 146, and an user interface 148. In various embodiments, the housing of carrier may 140 may be constructed of one of more of plastic, metal, ceramic, glass, or other form-sustaining material. In various embodiments, the housing may comprise multiple panels made of one or more form-sustaining materials, or the housing may be constructed through injection molding techniques. In various embodiments, the housing of carrier 140 may comprise multiple layers.

In various embodiments, the components may be affixed to the housing in various ways. In some embodiments, the components may be affixed to the housing by physical fasteners, such as screws or rivets. In various embodiments, the components may be affixed to the housing through crimping, welding, soldering, taping, gluing or cementing. In various embodiments, the housing may include brackets and the components may be designed to be held in place by the brackets. In some embodiments, a printed circuit board (PCB) including at least some of the components may be affixed to the housing. In various embodiments, a combination of different affixation techniques may be employed.

In various embodiments, the components of carrier 140 are powered by power source 146 via power line 149. In various embodiments, power source 149 may be a removable battery, a rechargeable battery, a solar cell, an inductive loop, or other power storage and/or generating components. In various embodiments, the battery may be both a removable battery and a rechargeable battery, and the battery may be recharged by removing the battery from the carrier and using an external charging station to recharge. In various embodiments, recharging of a rechargeable battery may be accomplished through an input on carrier 140, such as a micro USB port, or through induction technologies. In various embodiments, carrier 140 may include an input for receiving power from an external source, such as from an external power supply.

In various embodiments, wireless transceiver module 142 may be configured to transmit and receive communications over several different wireless communications standards and/or technologies. Such standards/technologies may include Wi-Fi, Bluetooth, near field communications (NFC), RFID, WiMAX, LTE, or other standards. In various embodiments, wireless transceiver module 142 may be configured to transmit and receive over one or more wireless communications standards/technologies. Wireless transceiver module 142 may comprise multiple transmitter modules and receiver modules, and necessary modulation and demodulation modules as required to conduct wireless communications.

Carrier 140 also includes an antenna 143 for conducting wireless communications. Antenna 143 is communicatively coupled to wireless transceiver module 142. In various embodiments, antenna 143 may a multi-purpose antenna, designed to transmit and receive over various communication standards, or antenna 143 may comprise more than one antenna for different communication standards. In various embodiments, antenna 143 may be a directional antenna for increased security of wireless transmission.

User interface 148 provides information to the user regarding the status of the transaction occurring. In various embodiments, user interface 148 may comprise one or more indicator lights configured to convey status information to the user in a variety of ways. The indicator lights may be LEDs or any other visual components. In various embodiments, only one indicator light may be provided that is configured to show a different color based on whether card 110 is probably connected with carrier 140 (red), whether the system is operational (green), or whether a transaction is processing (yellow). The recitation of green, red, and yellow as the colors of the indicators merely used as an example; any combination of colors is in accordance with the technology herein disclosed. Instead of using colors, in various embodiments there may be an indicator light for each of a number of different labeled indicators, such as "ON," "TRANSMITTING," "ERROR," or other type of information that would be pertinent to the user while conducting a transaction.

In various embodiments, user interface 148 may be a visual display, such as an LCD display or other visual/textual display. In these embodiments, user interface 148 would indicate in a visual manner to the user the status of the system and any transactions being conducted. In various embodiments, the visual display may be a touch-screen.

In various embodiments, user interface 148 may also include a power-on capability. This capability may be a switch, button, or other method of powering on and off carrier 140. In various embodiments, this capability may be separate from user interface 148.

In various embodiments, user interface 148 may a combination of the different interfaces discussed above. For example, user interface 148 may include a row of indicator lights and an LCD display, providing both visual indications from the indicator lights as well as textual explanations of the current status of the system.

In various embodiments, carrier 140 may also include a processing module (not shown) and memory (not shown) for performing operations related to user interface 148. In some embodiments, user interface 148 may be embedded on card 110. In such embodiments, the user interface may operate in the same manner as discussed above with regards to user interface 148 on carrier 140. In some embodiments, both carrier 148 and card 110 may include a user interface.

Figure 2:
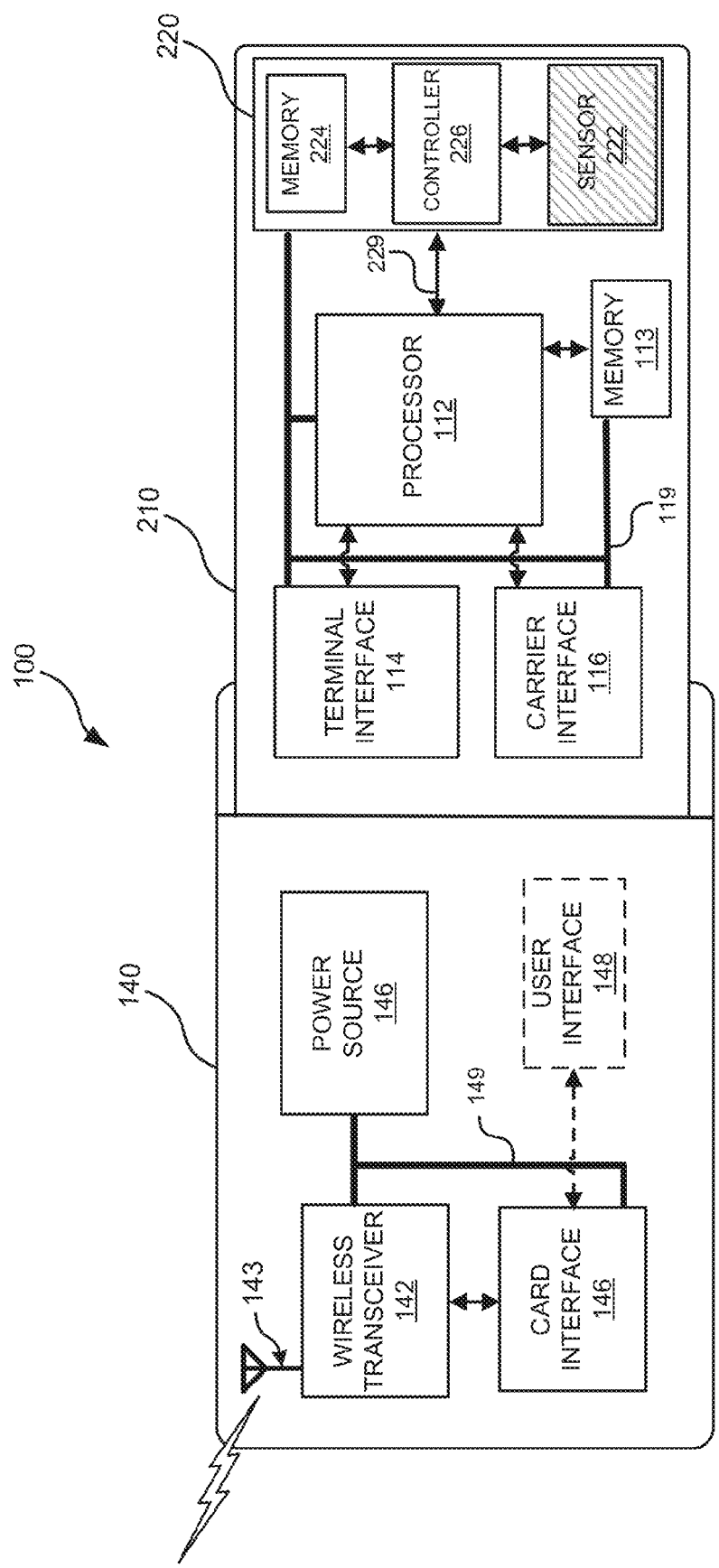
FIG. 2 is an example diagram of a smart card carrier and a smart card with an additional security layer in accordance with an embodiment of the technology disclosed herein.

As described above, there are many different types of smart card architectures that may be used by card designers. Card 110 in FIG. 1 represents only one example smart card. Smart cards compatible with the technology herein disclosed may have additional components, such as additional layers of transactional security. These other types of smart cards may include security features, such as personal identification numbers (PINs), passwords, or biometric security features that must be authenticated prior to a transaction being completed. FIG. 2 is another example of smart card system 200 with a card 210 having an additional security layer of a biometric authentication unit included. Although FIG. 2 describes the technology herein disclosed using a biometric authentication unit, the technology is similar to and compatible with smart cards using different security techniques and should not be interpreted to limit the technology herein disclosed to biometric authorization systems.

Card 210 includes similar components of card 110, including a processing module 112, a memory 113, a carrier interface 116, a terminal interface 114, and power line 119. These components operate in a similar fashion to the discussion above with respect to FIG. 1 regarding the components of card 110. In addition, card 210 includes a biometric authentication module 220. In various embodiments, biometric authentication module 220 includes an authentication memory 224, a controller module 226, and a biometric sensor 222. Authentication memory 224 may be configured to store a image or template of the biometric characteristics of an authorized user for authentication purposes. Authentication memory 224 may be a read-only memory (ROM) such as EPROM or EEPROM, flash, or any other storage component capable of storing biometric data of one or more authorized users at the time card 210 is issued. In various embodiments, authentication memory 224 may be capable of both read and write commands to allow for the addition of other later authorized users through a reassignment process after issuance of the card. In various embodiments, authentication memory 224 and memory 113 may be the same component.

Controller 226 is a processing module configured to execute authentication application programming stored in memory 224. In various embodiments, controller 226 accepts a biometric input from sensor 222 and creates a biometric image template for authentication, as described in more detail below. In other embodiments, controller 226 can receive an already created biometric image template from sensor 222 already formatted for authentication purposes. In various embodiments, controller 226 performs the biometric authentication process by comparing the biometric image template with the stored biometric data from authentication memory 224. Controller 226 is coupled to processing module 112 through connection 229. When a transaction is occurring, processing module 112 sends an authentication request to controller 226. Controller 222 then compares the biometric image template against the biometric data (e.g., a biometric template or image) stored in authentication memory 224. In some embodiments, controller 226 determines if the biometric image template is within a predetermined threshold value of the stored biometric data. Such a threshold value can be stored in authentication memory 224. If there is a match, controller 226 sends an indication to processing module 112 that the user is authenticated and the transaction may proceed. If there is not a match, controller 226 sends an indication to processing module 112 that the user is not authorized to conduct the transaction and to terminate the transaction session. In various embodiments, controller 226 may be a separate hardware processing module from processing module 112. In various embodiments, controller 226 may be implemented in software, such as a virtual machine (VM) executed using processing module 112. In such an embodiment, additional security features may be implemented within processing module 112, such as partitioning between the VM and the card operating system to ensure that no unauthorized access to the controller module occurs. In various embodiments, the authentication application programming executed by controller 226 may be stored in memory 113 and accessible by controller 226 through processing module 112. In various embodiments, controller 226 may have direct access to memory 113.

In various embodiments, biometric sensor 222 is a biometric reader or scanner capable of reading or scanning one or more biometrics of a user. Biometrics are human characteristics unique to an individual. In various embodiments, biometric sensor 222 may be configured as a fingerprint scanner, an iris scanner, a voice-identification unit, or other physiological characteristic of an individual. As discussed above, the biometric input from sensor 222 can be sent directly to controller 226 in order to allow controller 226 to create the biometric image template. In various embodiments, sensor 222 may be capable of turning the biometric input from the user into the biometric image template necessary for comparison.

In various embodiments, card 210 may have only a single component for processing both the transaction and authentication functions of card 210. In various embodiments, this single processing component may be processing module 112, and processing module 112 may be configured to execute both transaction applications and the functions of controller 226 described above. This eliminates the need for multiple processing units on the card and lowers the complexity of the design.

Figure 3:
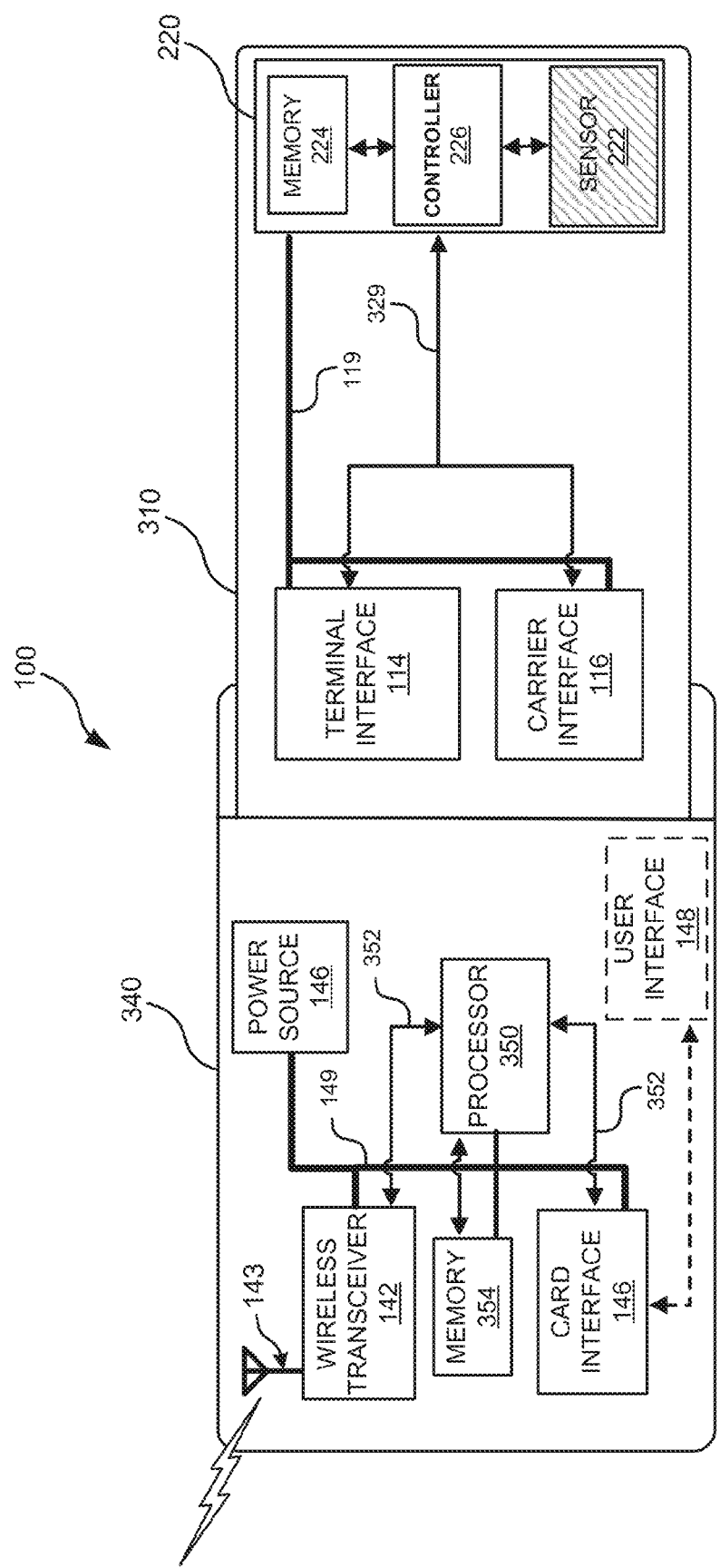
FIG. 3 is an example diagram of a smart card carrier and a smart card without on-board processing capabilities in accordance with an embodiment of the technology disclosed herein.

It may be useful to allow for the processing functions of the smart card to be performed by the carrier in certain situations, such as when the card designer intended for the processing to occur off the card to achieve a simpler card design. Such an example system is shown in FIG. 3. Carrier 340 is similar to carrier 140 shown in FIGS. 1 and 2, but also includes an on-board processing module 350 and memory 354. In various embodiments, processing module 350 may perform all the functions of carrier 350, including controlling wireless transceiver 142 and user interface 148, like the processing module and memory described (but not shown) in FIG. 1. In various embodiments, processing module 350 may be a separate processing component for performing the transaction application(s) of card 310. Unless otherwise discussed, the other components depicted in FIG. 3 may operate in various embodiments in the same manner as discussed with respect to corresponding components in FIGS. 1 and 2.

In various embodiments of the system depicted in FIG. 3, carrier 340 receives the biometric input from sensor 222 and the biometric template stored in authentication memory 224 via carrier interface 116. In various embodiments, controller 226 may be the same as processing module 112, only without the functionality to perform the authentication process. Controller 226 sends the biometric data from sensor 222 and authentication memory 224 to carrier interface 116 over connection 329. Processing module 350 of carrier 340 receives the biometric data from via card interface 146 over connections 352 and performs the authentication function as described with respect to FIG. 2. In various embodiments, memory 354 may store the authentication application, transaction application(s), or both. In various embodiments, controller 226 may send the biometric input from sensor 222 to carrier 140, and processing module 350 can access memory 354 for the necessary authentication application and perform the authentication process. In various embodiments, the authentication program may be stored in authentication memory 224, and the program may also be sent to carrier 340 via carrier interface 116. In various embodiments, memory 354 can store the biometric data discussed above with regards to authentication memory 224 for authentication purposes.

Although carrier 340 has been described as performing the authentication functions of card 310, this should not be read to limit the functionality of carrier 340. Carrier 340 may be designed to perform any transaction or function associated with card 310, or any other smart card employed. In various embodiments, carrier 340 may perform any function stored on or designed to be performed by card 310, or other smart card employed in the system. In various embodiments, memory 354 may store all the applications necessary to conduct any financial transaction or access authorization to a facility or computer system.

Figure 4:
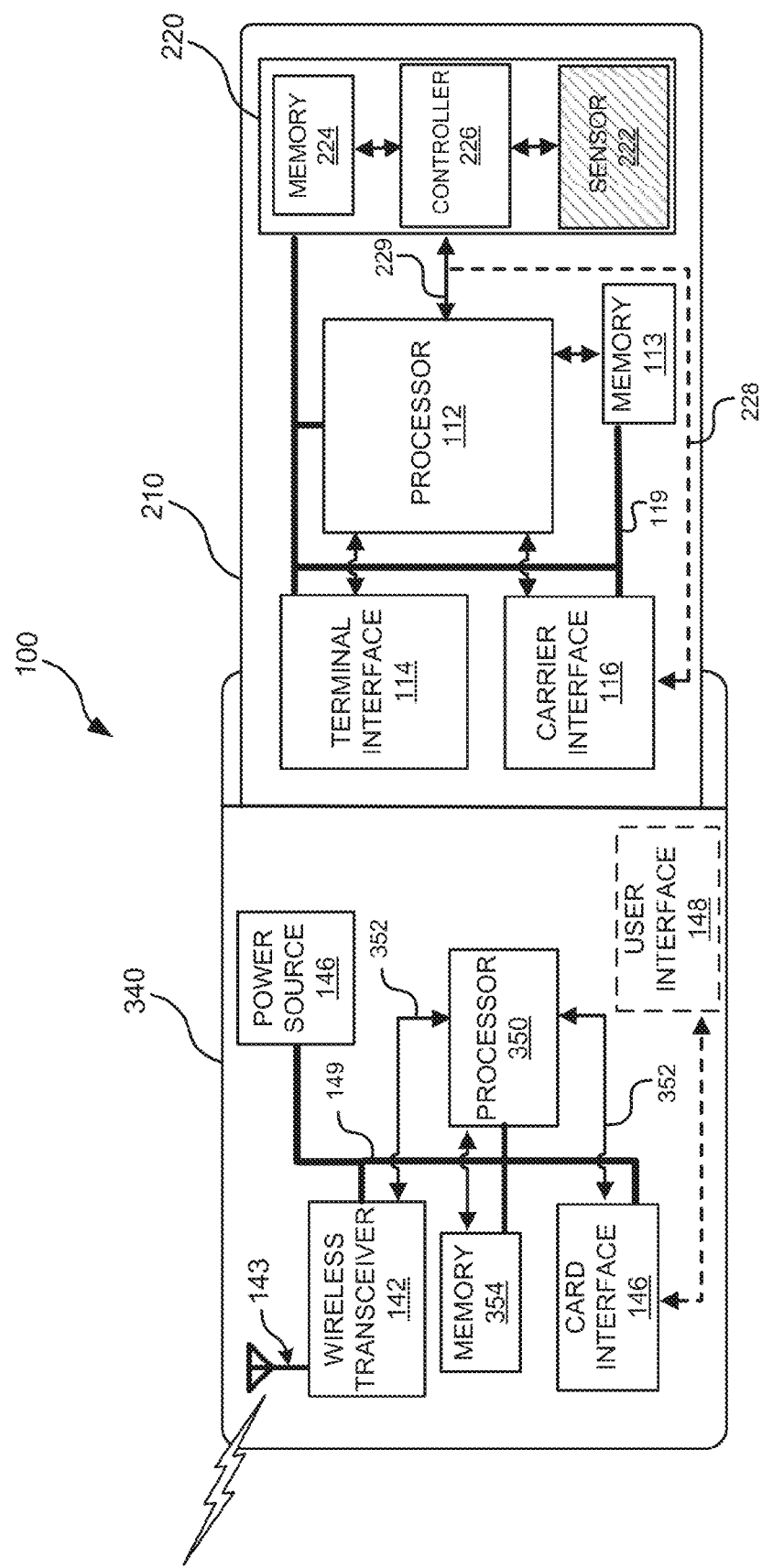
FIG. 4 is an example diagram of a smart card carrier having an on-board processor and a smart card in accordance with an embodiment of the technology disclosed herein.

Although FIGS. 1-3 describe the processing function as being performed by either the carrier or the smart card, various embodiments include both the carrier and the smart card to have processing capabilities. An example of a system employing carrier 340 and card 210 is shown in FIG. 4. Both carrier 340 and card 210 include processing modules (modules 350 and 112, respectively) that allow both objects to process information. In various embodiments, when card 210 is inserted into carrier 340, carrier 340 may send a command to card 210 via card interface 146 to forward all required information to carrier 340 for processing. In various embodiments, card 210 may perform all the processing, as discussed with respect to FIG. 2, and processing module 350 may only process information related to functionality of the carrier, such as the display of user interface 148. In various embodiments, card 210 and carrier 340 may share processing functions, such as authentication occurring on card 210 but completion of the transaction occurring on carrier 340. In some embodiments, authentication module 220 may communicate directly with carrier 340. Carrier 340 may send a request directly to authentication module 220 through carrier interface 116 over data line 228. In various embodiments, carrier 340 may send a request to processing module 112, requesting information from authentication module 220. Authentication module 220 can then send the requested data directly to carrier interface 116 over data line 228, instead of sending the data to processing module 112 over data line 229. In this way, carrier 340 may communicate with authentication module 220 without needing to pass all messages through processing module 112.

In various embodiments, carrier 340 may be restricted to use with only certain smart cards. For example, memory 354 may store an authorized list of the smart cards with which carrier 340 may operate. In various embodiments, the authorized list may identify the authorized smart cards based on a serial number or other identifying information of the cards themselves.

Instead of restricting use of carrier 340 to only certain smart cards, use can be restricted to only certain individuals. Memory 354 may store a set of authentication data, such as a copy of the biometric data stored in authentication memory 224, a passcode, or PIN, for each individual authorized to use carrier 340. When a person attempts to use carrier 340 with a smart card enabled with additional levels of security, carrier 340 may refuse to allow wireless communication until the person is authorized to use carrier 340. In this way, the carrier could be personalized for use only be one individual, in the event that someone tries to use carrier 340 to conduct wireless transactions.

FIGS. 5 and 6 are high-level diagrams showing how the cards and carriers such as the ones shown in FIGS. 1-4 interact in a system in accordance with the technology. In FIG. 5, card 210A is shown separate from carrier 140A. As indicated by the arrows, the housing 300 of carrier 140A has opening 310 configured to accommodate or accept card 210A. The top face of carrier 140A is shorter than the length of card 210A to enable access to biometric sensor 222. FIG. 6 shows an example of how card 210A fits within carrier 140A through opening 310. As shown, the biometric sensor 222 on card 210A remains accessible by a user after card 210A is inserted into carrier 140A. Although FIGS. 5 and 6 show one configuration of carrier 140A, other configurations are contemplated by the technology herein disclosed, and FIGS. 5 and 6 should not be interpreted to limit the scope of the present disclosure in any way.

Figure 7:
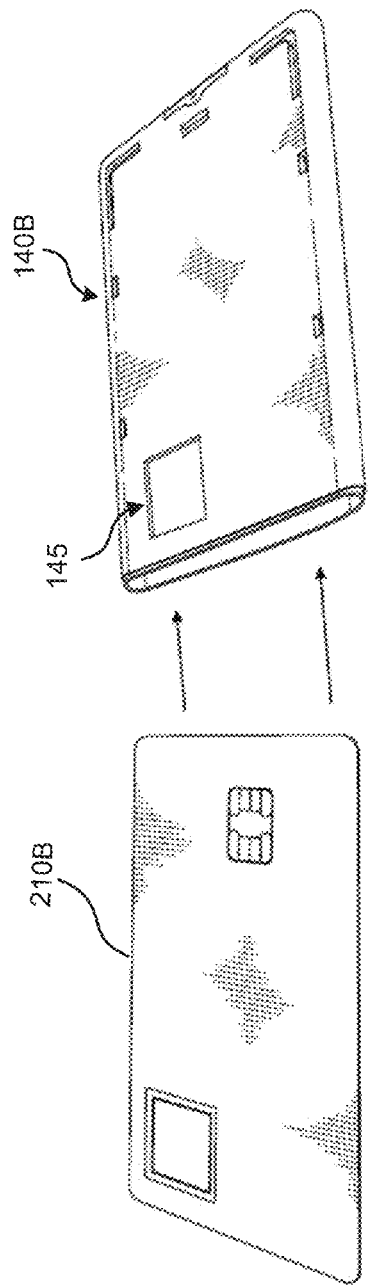
FIG. 7 is an example diagram of the mating of a smart card carrier and a smart card in accordance with another embodiment of the technology disclosed herein.
Figure 8:
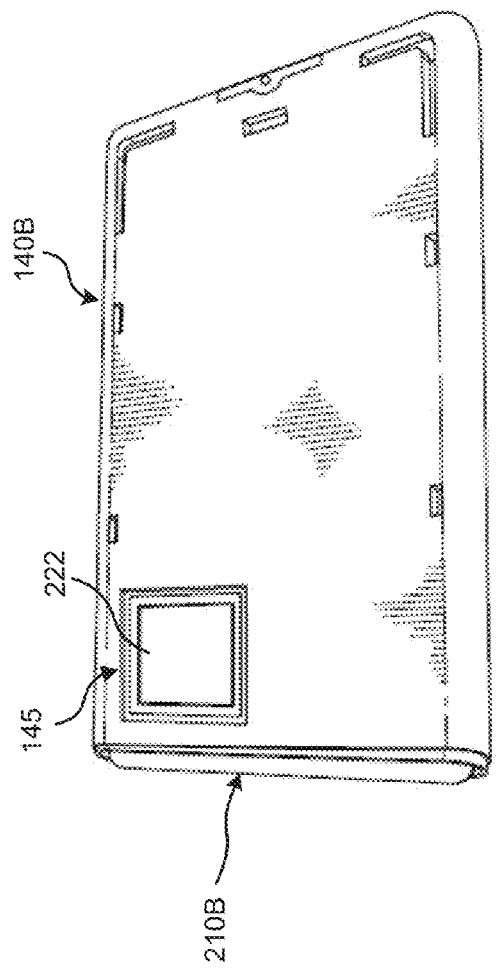
FIG. 8 is an example diagram illustrating a smart card engaged with a smart card carrier in accordance with another embodiment of the technology disclosed herein.

In various embodiments, the smart card carrier may include a cut-out providing access to a biometric sensor provided on a smart card and facilitate the use of the biometric security layer. FIGS. 7 and 8 illustrate an example of this configuration. There is a cutout 145 in the top face of carrier 140B over the portion of card 210B containing biometric sensor 222. This cutout provides greater protection of card integrity by fully enveloping the card while still allowing full access and implementation of the biometric security layer.

Although FIGS. 5-8 discuss the embodiments in terms of a "top" face and a "bottom" face, the use of such language are merely descriptive and do not imply or require that the disclosed technology be implemented or used in a particular spatial orientation.

Figure 9:
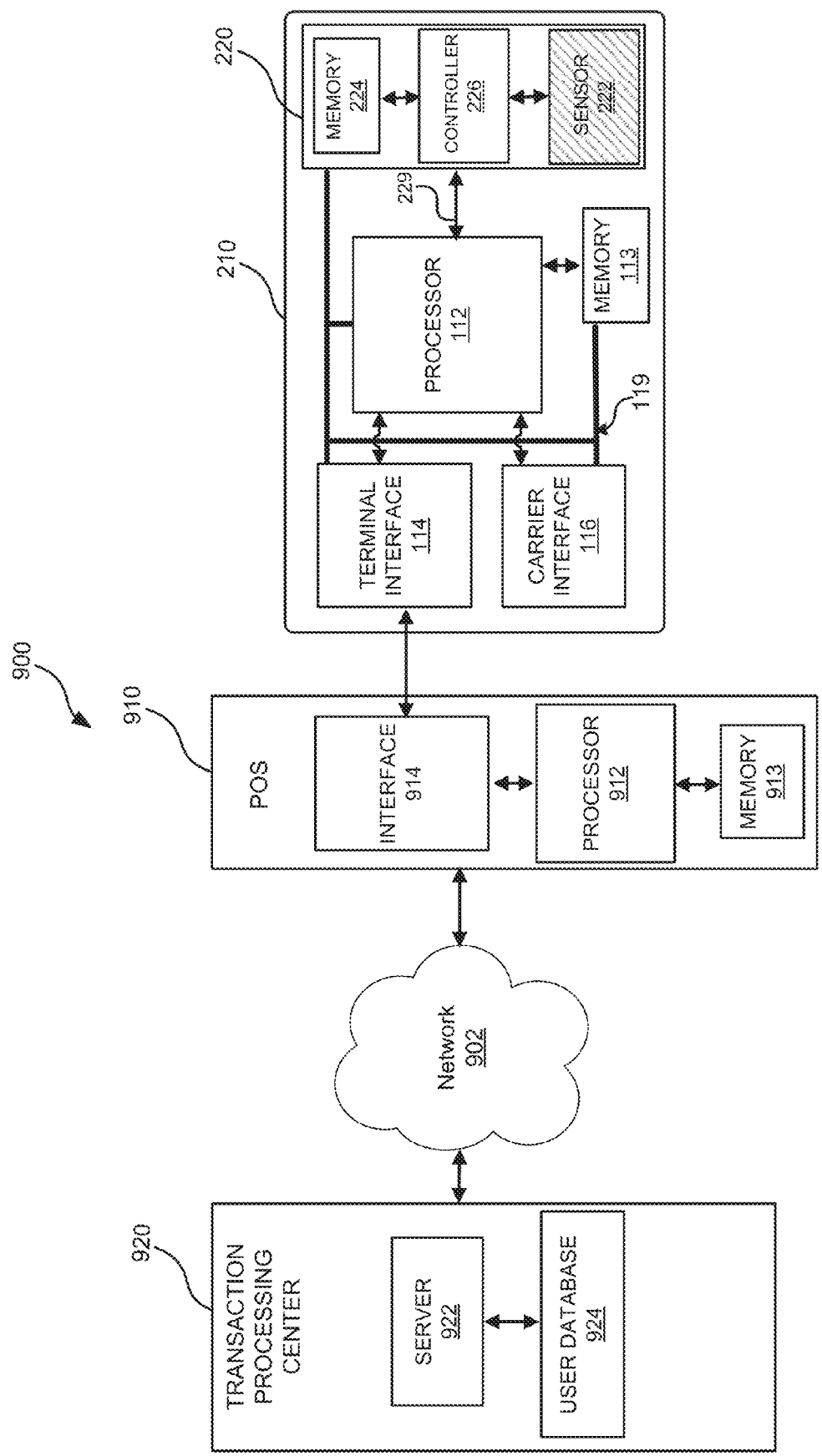
FIG. 9 is an example transaction system in accordance with an embodiment of the technology disclosed herein.
Figure 10:
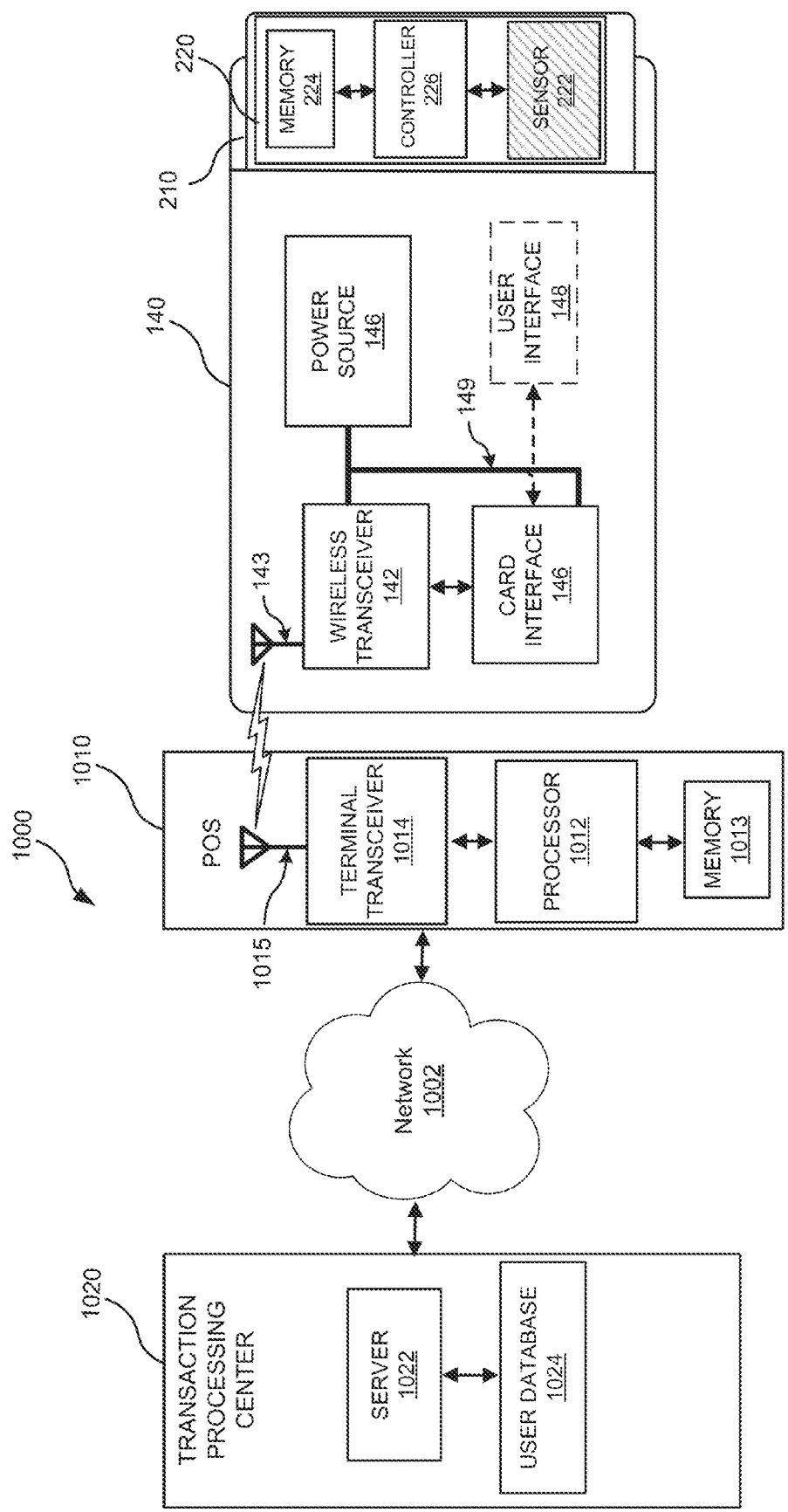
FIG. 10 is an example wireless transaction system in accordance with an embodiment of the technology disclosed herein.
Figure 11:
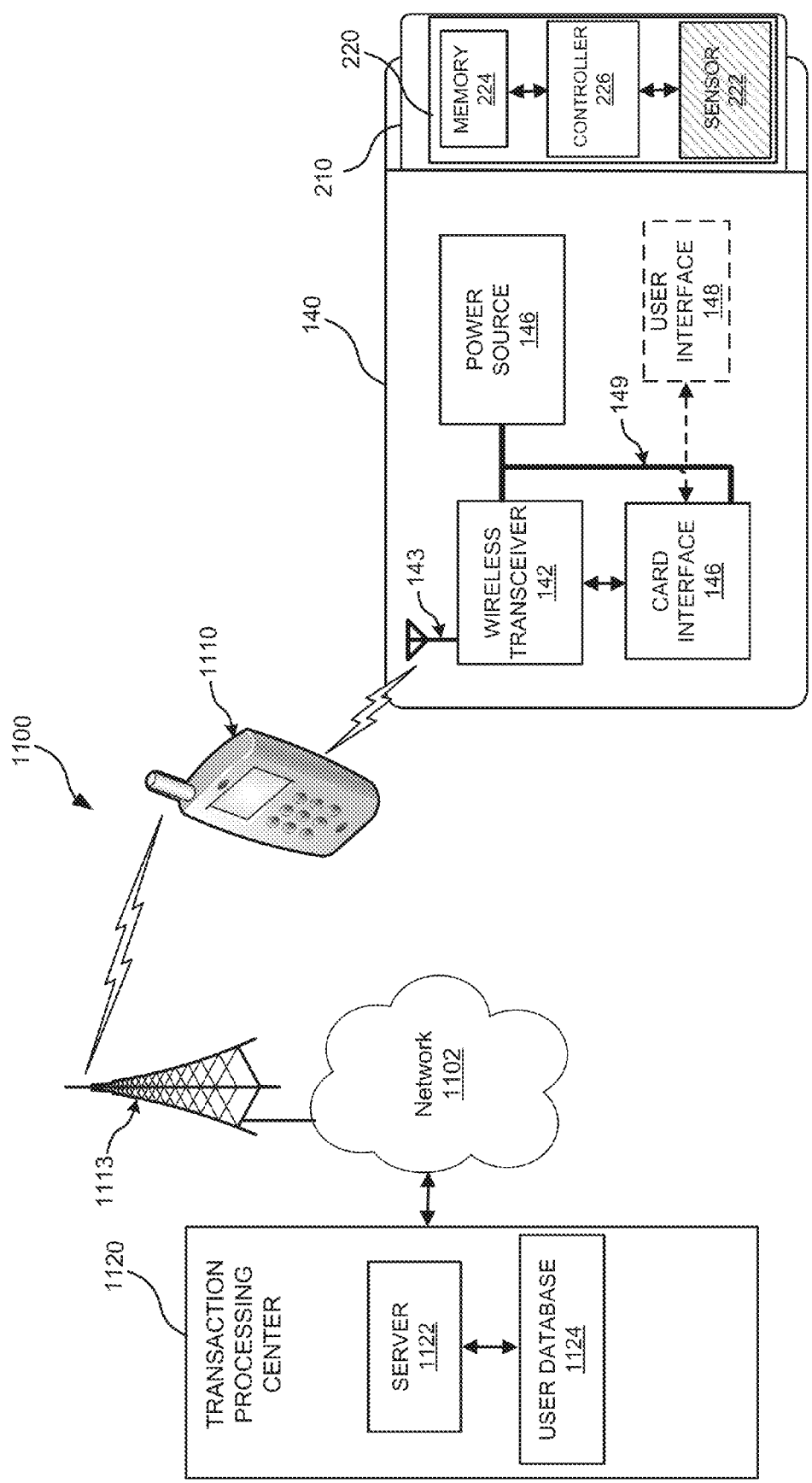
FIG. 11 is another example wireless transaction system in accordance with an embodiment of the technology disclosed herein.

FIGS. 9-11 illustrate example environments and transactions that may be conducted in accordance with the technology herein disclosed. Although FIGS. 9-11 are shown using card 210 described above, the system architecture is similar to and functions in a similar manner utilizing smart cards in accordance with card 110, card 310, or any other smart card. The use of card 210 is for example purposes only and should not be interpreted to limit the scope of the technology herein disclosed.

FIG. 9 illustrates transaction system 900 comprising a smart card and a POS terminal 910. For the purpose of illustration, the smart card shown in FIG. 9 is card 210 illustrated in FIG. 2, but the smart card can be card 110, card 310, or any other smart card. In this embodiment, card 210 is used without carrier 140 or carrier 340. Terminal 910 includes an interface 914, which may be any type of smart card reader known in the art. In various embodiments, terminal 910 may also include a terminal processing module 912 and a terminal memory 913. Card 210 interacts with terminal 910 through a physical connection of terminal interface 114 and interface 914. This connection is made by inserting card 210 into a smart card reader of terminal 910. In various embodiments, terminal 910 supplies power to card 210 through this physical connection, in a similar fashion as described above in regards to the description of terminal interface 114 in FIG. 1. Terminal 910 is connected to a transaction processing center (TPC) 920. In various embodiments, TPC 920 may be operated by a user's bank, a smart card issuer, a merchant, or some other entity, and may include a server 922 and a user database 924 for storing, processing, and authorizing transactions between the smart card user and the merchant. Terminal 910 and TPC 920 may be connected over a network 302. In various embodiments, terminal 910 and TPC 920 may be geographically displaced and network 902 may be an Internet connection. In various embodiments, terminal 910 and TPC 920 may be co-located and connected through a local area network (LAN) or intranet connection. The method of transaction between terminal 910 and TPC 920 is not required to understand the technology herein and outside the scope of this disclosure.

To conduct a transaction, terminal 910 sends a request to conduct a transaction via interface 914 to card 210 via terminal interface 114. Processing module 112 receives the request and sends an activation message to controller 226 to activate biometric authentication module 220. As discussed above, card 210 receives power through terminal interface 114 from terminal 910, which powers the components of card 210 via power line 119. After activation, controller 226 receives biometric input from sensor 222. The biometric input received is contingent on the type of sensor employed, such as a fingerprint scanner or an iris scanner. After controller 226 receives one or more inputs from biometric sensor 222, controller 226 access the stored biometric data in authentication memory 224 and determines whether there is a match. If there is a match, controller 226 sends a message to processing module 112 via connection 229 that the transaction is authorized to be conducted. After receiving the authentication notification, processing module 112 may execute application instructions stored in memory 113 and transmit to terminal 910 the information (e.g., a password or certificate) necessary to complete the transaction via terminal interface 114. In some embodiments, the password or certificate is encrypted before it is transmitted.

In various embodiments, if controller 226 determines that there is not a match between the biometric input from sensor 222 and the biometric data stored in memory 224, controller 226 sends an indication or notification to processing module 112 over connection 229 that the user is not authorized to conduct the transaction. In various embodiments, processing module 112 may simply not respond to the request from terminal 910. In other embodiments, processing module 112 may execute an application instruction stored in memory 113 regarding unauthorized access attempts and send a notification to terminal 910. In some embodiments, upon receiving one or more indications of unauthorized use from controller 226, processing module 112 deactivates the card 210 to prevent a further attempt.

In accordance with the technology disclosed herein, the same transaction process discussed above in regards to FIG. 9 may be conducted wirelessly using carrier 140 described and shown in FIGS. 1 and 2. Such a use is illustrated in FIG. 10 by transaction system 1000. Terminal 1010 is similar to terminal 910 shown on FIG. 9. In various embodiments, terminal 1010 may include a terminal transceiver 1014, communicatively coupled to an antenna 1015, to enable wireless transactions to occur. In various embodiments, terminal 1010 may also include an interface, like the interface 914 in terminal 910 of FIG. 9, but such an interface is not required in terminal 1010. Card 210 is inserted into carrier 140 in a manner similar to that shown in FIGS. 5-8. Unlike the transaction described in FIG. 9, card 210 does not interact directly with terminal 1010 but instead communicates with terminal 1010 through wireless transceiver module 142 of carrier 140. Terminal 1010 sends a request to conduct a transaction via terminal transceiver 1014 to wireless transceiver module 142 of carrier 140. As discussed above, the communication standard used depends on the type of wireless transceiver employed within terminal 1010 and carrier 140. In various embodiments, wireless transceiver 142 may be compatible with more than one communication standard/technology, such as Bluetooth, NFC, and Wi-Fi, in order to provide greater operability of carrier 140 with a variety of systems.

Wireless transceiver module 142 then transfers the request message to card interface 146, which is communicatively coupled to carrier interface 116 of card 210. In this way, the message from terminal 1010 is communicated to processing module 112 of card 210 without card 210 physically in contact with terminal 1010. Processing module 112 operates in the same manner as if it was in physical contact with terminal 1010, similar to the operation discussed above in regards to FIG. 9.

Just as terminal 910 provided power to card 210 through terminal interface 914, carrier 140 supplies power from power source 146 to card 210 through card interface 146. In this way, no on-board power source is required on card 210 to power authentication module 220, processing module 112, or any other components that might be present in card 210. In this way, the enhanced capability of conducting wireless transactions may be provided to a simple contact smart card. Wireless transceivers capable of Bluetooth, Wi-Fi, or other higher-protocol communication standards or technologies require more power than could feasibly be included in the form factor of a credit card in a cost effective manner.

Moreover, use of an external contactless transaction system in accordance with the technology disclosed herein, like carrier 140, allows for smart cards with additional layers of security to be created and compatible with many different systems. For example, a smart card with a biometric sensor such as card 210 of FIG. 2 would not be able to function easily with a transaction system, like an ATM machine, that requires the entire card to be inserted into the machine and to remain there during the entirety of the transaction. This feature is for security purposes, to ensure that someone cannot come and easily swipe a person's ATM card. However, it makes it impossible to utilize the biometric authentication feature of the card. Using a smart card carrier such as carrier 140 allows for ease of use of the biometric authentication feature.

As technology continues to advance, transactions are occurring not only at POS terminals in fixed locations, but also with mobile devices. In various embodiments, these mobile devices may include hand held POS terminals, mobile card readers, smartphones, PDAs, laptop computers, tablet computers, or other portable computing devices. Accordingly, FIG. 11 illustrates an example transaction system 1100 including a mobile terminal 1110. Although mobile terminal 1110 is different from terminal 1010, the transaction would occur in a way similar to the transaction described in FIG. 10.

Figure 12:
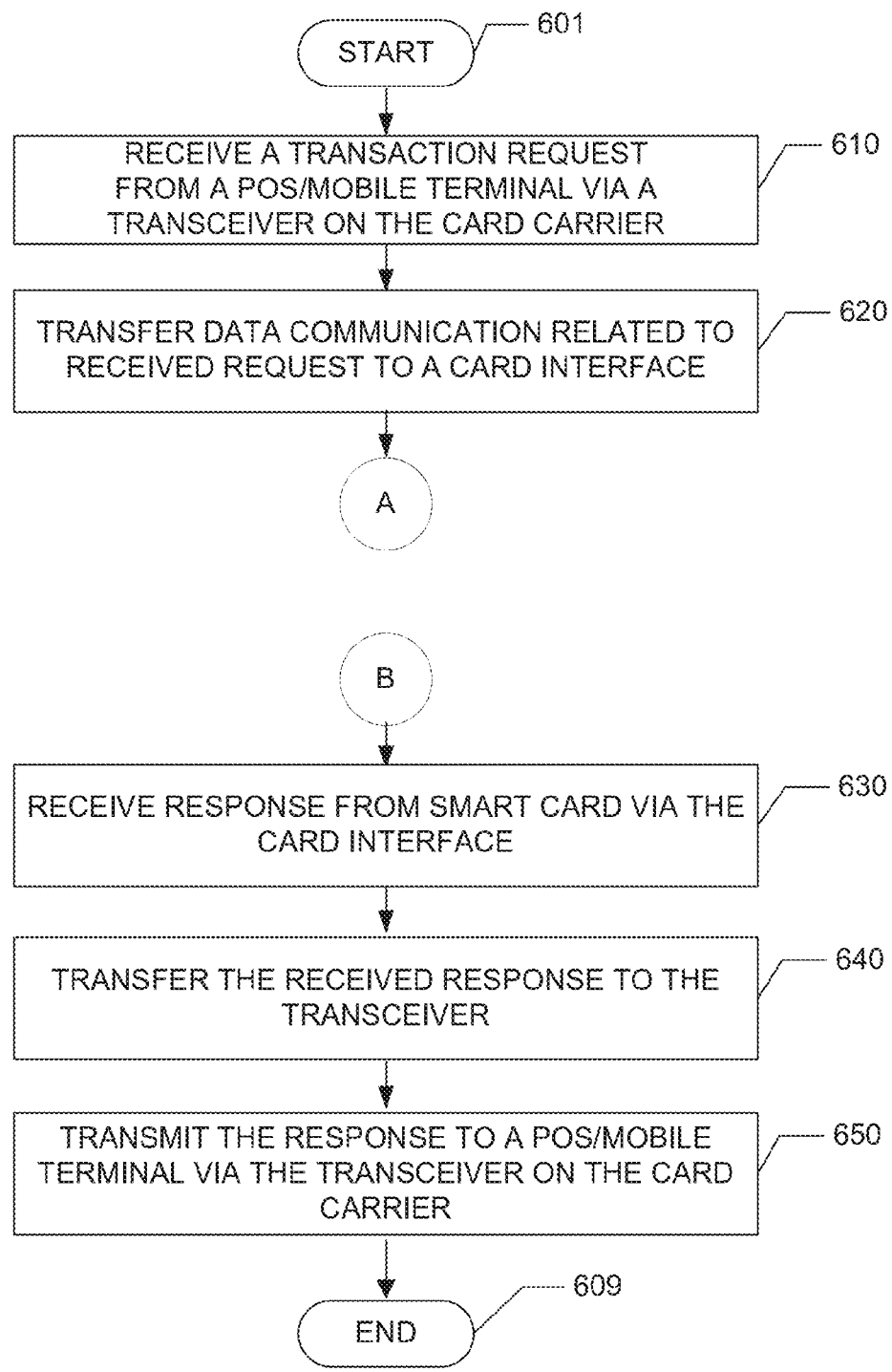
FIG. 12 is an example flow diagram of a method of conducting a wireless transaction using a smart card carrier in accordance with an embodiment of the technology disclosed herein.

An example method of conducting wireless transactions with a contact smart card using a smart card carrier in accordance with the technology disclosed herein is provided. FIG. 12 details the steps of the method from the perspective of the smart card carrier. At step 610, the smart card carrier receives a transaction request wirelessly sent from a POS or mobile terminal. In various embodiments, the transaction request could be one of the following non-limiting examples: credit or debit charges, computer access, or facility access. A wireless transceiver in the smart card carrier receives the request from the POS or mobile terminal. The request could be communicated using a variety of different wireless communication standards or technologies, including Bluetooth, Wi-Fi, NFC, RFID, or others.

At step 620, the smart card carrier engages in data communication with one or more processors on a smart card. In various embodiments, the data communication involves request by the smart card carrier for information from the smart card. For example, where the smart card carrier is capable of conducting an authentication process, the data communication may be a request for the smart card to transmit stored biometric or other authentication-related data from a memory on the smart card to the carrier. In other embodiments, the data communication between the smart card carrier and the smart card may be a transfer of the transaction request as received by the smart card carrier to the smart card for processing. In other embodiments, the data communication could be any other type of communication related to the transaction request, such as communications about where the authentication procedure occurs or the an indication of the results of authentication. The smart card interface is communicatively coupled to the contacts of the contact smart card.

Figure 13:
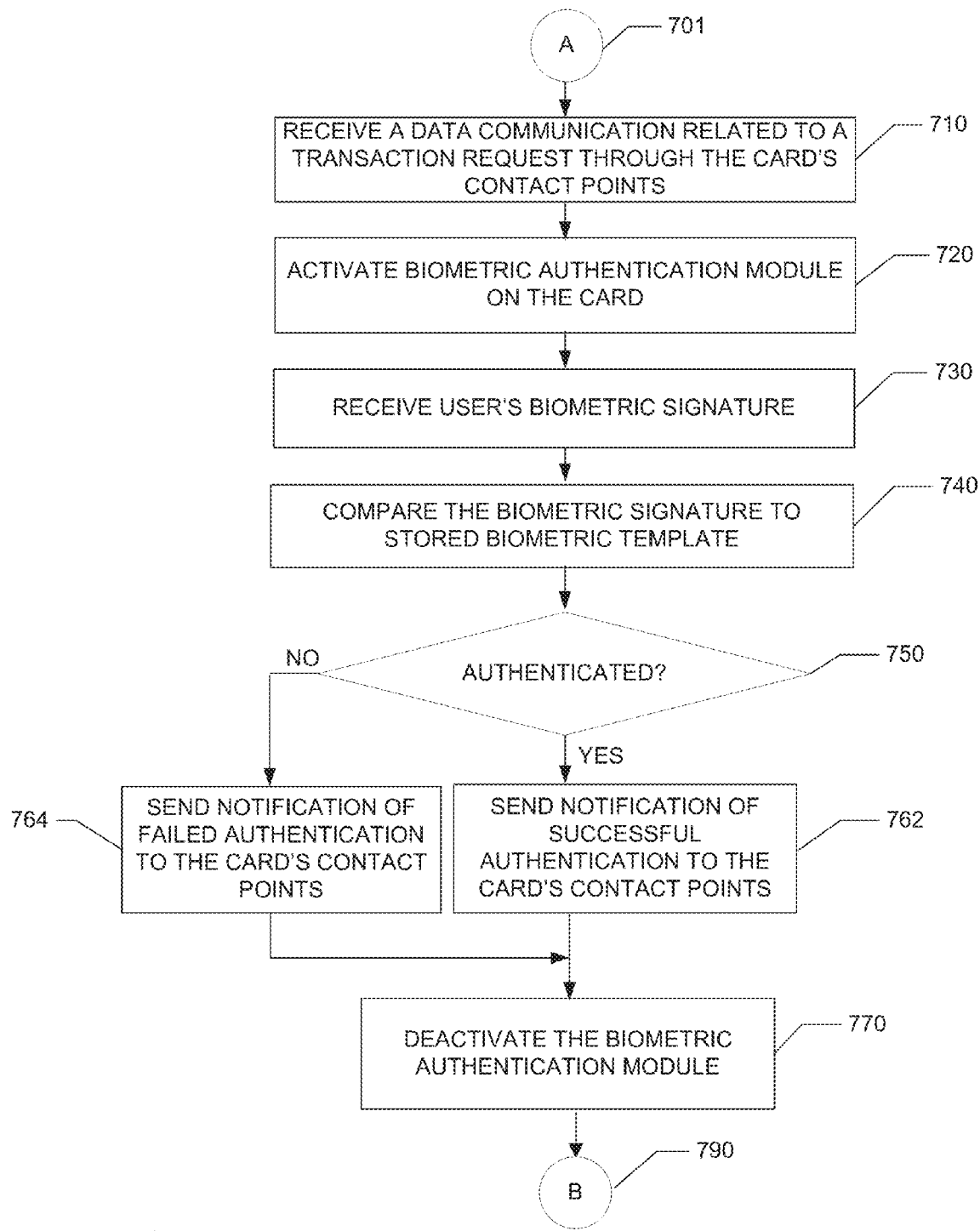
FIG. 13 is an example flow diagram of a method of conducting a wireless transaction using a biometric authentication smart card and a smart card carrier in accordance with an embodiment of the technology disclosed herein.

The method transitions at point A to the example processing of the request by the smart card, illustrated in FIG. 13. Although depicted as processing by a biometric secured smart card, the flowchart is only an example of one embodiment of the method. For contact smart cards without additional security features, the method would exclude the authentication process and simply send a response to a transaction request.

At step 710, the smart card receives the data communication related to the transaction request of a terminal from the smart card carrier through the smart card's contact points. In some embodiments, the request appears as an ordinary request through the smart card's contact points because it is engaged with the smart card carrier in the same fashion as if the smart card was engaged with the terminal directly, e.g., via terminal interface 114 shown in FIGS. 1 and 2. In other embodiments, the request from the smart card carrier may be a data communication related to the transaction request, but not the transaction request as originally received, as discussed above with respect to step 620 of FIG. 12. In various embodiments, the request transferred to the smart card may be any type of data communication necessary to complete the transaction according to the type and location of the processing functions required. The request is sent to one or more processing modules of the smart card.

If the smart card has additional layers of security, the authentication process is activated at step 720. In this example, the authentication process is a biometric security check. In various embodiments, other types of layered security may be used, such as a PIN or a password, in lieu of or in addition to the biometric authentication. In embodiments where the authentication process occurs at the smart card carrier, one or more of the steps 720-770 may occur at the smart card carrier instead of on the biometric smart card.

At step 730, the card receives the user's biometric signature. In various embodiments, the user's biometric signature may be a fingerprint, a voice sample, an iris scan, or other biometric characteristic utilized to authenticate the user's identity. In various embodiments, the user may enter a PIN or password associated with the user at step 730.

At step 740, the user's biometric signature is compared with a biometric template stored on the smart card. This biometric template may be stored in an authentication memory separate from any other memory of the smart card, or it could be stored in the same memory with other applications and data used by the smart card. In various embodiments, the template stored in memory may be a copy of the user's PIN or password for comparison.

The smart card decides whether the biometric signature is authentic at step 750. The particular level of similarity or the metrics used to determine if a biometric signature is the same or similar enough to the template to qualify as authentic may vary.

If the signature is determined to be authentic, a notification of a successful authentication is sent to the card's contact points at step 762. This notification could be a simple notice that the user is the authentic user, the relevant information requested by the terminal, or a combination of both. In various embodiments, the notification could also include additional indications, such as the level of accuracy of the authentication process or requests from the card for additional information from the terminal. The content of the notification may vary depending on the complexity built into the smart card applications or applications.

If the smart card determines the signature is not authentic, a notification of a failed authentication is sent to the card's contact points at step 764. Similar to the notification for a success, the notification of failure may include additional information related to the failure, such as request for the terminal to contact the smart card issuer or a request to restart the transaction process. In various embodiments, if the authentication is unsuccessful the smart card could send no message to the contact points and instead merely ignore the transaction request.

At step 770, the smart card can deactivate the authentication module. In various embodiments, the authentication process may need to only be completed once during a transaction session. The result of a successful authentication could be stored in a memory of the smart card for the duration of a transaction session. In other embodiments, the authentication process may be repeated for each request received by the smart card.

After the smart card processes the transaction request, a response is received from the smart card via the card interface of the smart card carrier at step 630 of FIG. 12.

At step 640, the card interface transfers the response to the wireless transceiver for transmission to the requesting terminal. This is done in the same, but reversed, manner as step 620.

At step 650, the wireless transceiver transmits the response to terminal. If no further action is required the transaction is completed. If more information is needed or additional actions are to be taken, the method may repeat itself.

In various embodiments, cards 110, 210, and/or 310 may include a GPS antenna, beacon, or other indicator component that allows for determining the location of the card. This additional functionality allows for an added layer of transaction security by allowing authentication to occur based on location, in addition to other authentication methods such as biometrics or passcodes (PINs), for example. In various embodiments, carriers 140 or 340 may include such a GPS antenna, beacon, or other indicator component. When a transaction is occurring in an unfamiliar location based on the user's identity, carriers 140 or 340 may request additional verification of the user, either through performing on-board biometric authentication as described in FIG. 2 again, reentering the passcode, password, or other identifying code of the user, or other authentication method.

Use of location-based authentication may also provide additional security when the smart card is being used as a method of restricting access to certain areas within a facility. A particular smart card may be issued to a certain individual, who is authorized to enter certain areas of a facility, base, headquarters, or other location. Carriers 140 or 340 may be used with the issued card to allow for wireless communication with the internal network of the facility controlling access to different areas. In various embodiments, the network administrator may send out a request for reauthentication to ensure that the person has access to the area in which they are located. The holder would then conduct the authentication procedure as described above with respect to FIGS. 2 and 12-13 to verify that the holder is the person with proper access to that area. In various embodiments, the network may be programmed to send out the periodic request. This is useful in eliminating the risk of unauthorized access to areas by persons who steal another person's access card, or who happen to find a card that is misplaced by the authorized person, for example if the card fell out of the authorized person's pocket. In various embodiments, the holder may be required to verify his or her identity each time access is requested to an area within the facility. This authentication process is also applicable to access to non-physical areas, such as access to computer networks.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A smart card carrier comprising:
   a housing having an opening configured to accept a smart card, the smart card comprising a biometric sensor for capturing a biometric image and a memory for storing a biometric reference template of an authorized user;
   a smart card interface configured to be coupled to the smart card when the smart card is accepted into the opening and configured to provide a data communication link with one or more processors in the smart card;
   a wireless transceiver configured to engage in wireless data communication with a transaction terminal when the smart card interface is coupled to the smart card; and
   a power source configured to supply power to the wireless transceiver and the smart card interface.

2. The smart card carrier of claim 1, wherein the wireless transceiver is configured to communicate over one or more of Bluetooth, Wi-Fi, near field communication, and RFID.

3. The smart card carrier of claim 1, further comprising a user interface, wherein the user interface comprises one or more indicator lights and wherein the indicator lights are configured to communicate a status of the transaction to the user.

4. The smart card carrier of claim 1, further comprising a user interface, wherein the user interface comprises a text display and wherein the text display is configured to communicate a status of the transaction to the user.

5. The smart card carrier of claim 1, wherein the smart card interface is further configured to supply power from the power source to the smart card when the smart card interface is coupled to the smart card.

6. The smart card carrier of claim 1, wherein the user interface comprises a number pad and wherein the number pad is configured to allow a user to enter a security pin associated with the smart card.

7. The smart card carrier of claim 1, wherein the housing comprises a top face and a bottom face that are parallel to each other and separated by a smart card space, wherein the smart card space is enclosed on three sides.

8. The smart card carrier of claim 7, wherein the smart card comprises a biometric sensor, and the top face or bottom face are designed to allow access to the biometric sensor.

9. The smart card carrier of claim 8, wherein the length of the top face or the bottom face is shorter than the length of the other of the top face or bottom face to allow access to the biometric sensor.

10. The smart card carrier of claim 8, wherein the top face or bottom face includes an aperture configured to allow access to the biometric sensor of the smart card.

11. The smart card carrier of claim 8, wherein the biometric sensor is a fingerprint sensor.

12. The smart card carrier of claim 1, further comprising a processor, wherein the processor of the smart card carrier is configured to engage in data communication with the wireless transceiver and further with the one or more processors on the smart card.

13. The smart card carrier of claim 12, wherein the one or more processors on the smart card comprise a biometric controller configured to generate a biometric image template based on the biometric image captured by the biometric sensor disposed on the smart card, and the processor of the smart card carrier is configured to perform a matching between the biometric image template received from the smart card and a biometric reference template.

14. The smart card carrier of claim 13, wherein the one or more processors in the smart card further comprise a processor configured to perform the matching between the biometric image template and the biometric reference template when the smart card is not coupled to the smart card interface of the smart card carrier.

15. The smart card carrier of claim 1, further comprising a location-determining component.

16. A method of facilitating wireless transactions with a smart card through a smart card carrier, the method comprising:
receiving from a wireless transaction terminal a request related to a transaction involving the smart card;
engaging in data communication related to the request with one or more processors in the smart card through a smart card interface coupled to an interface on the smart card, the smart card comprising a biometric sensor for capturing a biometric image and a memory for storing a biometric reference template of an authorized user; and
transmitting a response to the request to the transaction terminal through the wireless transceiver.

17. The method of claim 16, further comprising the step of authenticating a user of the smart card.

18. The method of claim 17, wherein the step of authenticating the user comprises:
receiving a user input of a personal identification number;
comparing the user input with a stored personal identification number for a match; and
if a match is found, outputting a response to the request to the interface of the smart card.

19. The method of claim 17, wherein the step of authenticating the user comprises:
receiving a user input of a biometric signature;
comparing the user input with a stored biometric for a match; and
if a match is found, outputting a response to the request to the interface of the smart card.

20. The method of claim 16, wherein the wireless transaction terminal is a mobile device.

21. The method of claim 16, wherein the wireless transaction terminal is a contactless smart card reader.

22. The method of claim 16, further comprising the step of supplying power to the smart card via the smart card interface.

* * * * *